June 4, 1935.  E. L. DE MARIS  2,003,345

DEVICE FOR ORIENTING TEST CORES

Filed March 5, 1934

ELMER L. DE MARIS
INVENTOR

ATTORNEY

Patented June 4, 1935

2,003,345

UNITED STATES PATENT OFFICE 2,003,345

DEVICE FOR ORIENTING TEST CORES

Elmer L. De Maris, Los Angeles, Calif.

Application March 5, 1934, Serial No. 714,175

6 Claims. (Cl. 255—72)

The object of my invention is to provide a means for so marking the core produced by a core drill that its original horizontal angle may be ascertained when the core is withdrawn from the hole and brought to the surface of the earth.

In drilling deep wells for oil and other purposes it is common practice to take, at suitable intervals, cores which constitute a section and sample of the formation about to be penetrated by the drill. The device used for this purpose is a hollow drill into the body or barrel of which the core is received as the drill is revolved and lowered, and this device has means for breaking off the core at its lower end when a desired depth has been penetrated; so that on withdrawing the drill the core is brought to the surface of the earth.

When coring in shale, sandstone, or other formations having any degree of consistency, the core, as withdrawn from the barrel, often exhibits transverse planes or bands of diverse color or consistency, and these planes may be perpendicular to the axis of the core or may be at an angle other than a right angle to such axis. If the core is taken with the drill in a vertical position, the occurence of markings perpendicular to the axis of the core indicates that the formations penetrated by the drill are horizontally bedded at that particular depth, while if the markings are other than perpendicular, it is known that the formations dip at an angle to the horizontal equal to the angle of the marking planes to a plane normal to the core axis. Any deviation from the vertical may readily be determined by well known means and a suitable correction applied to the direct reading.

It is often a matter of serious interest to measure this angle, but the information thus gained is usually of little value unless the compass direction of the dip thus measured can also be ascertained. This direction cannot be known unless the original position of the core in the hole is known. It is the object of my invention to so mark the core or, to speak more accurately, the material from which the core is later formed, that on the withdrawal of the core or of the fragments into which it may be broken, it may be assembled in the same order and angular position as that which it occupied before it was broken away, thus making it possible to read not only the angle but also the direction of dip directly from such marking planes as may occur in the core.

The device which I propose for this purpose is illustrated in the attached drawing, in which Fig. 1 represents, partly in vertical section and partly in elevation, the complete device assembled in a core bit represented by dotted lines;

Figure 1:
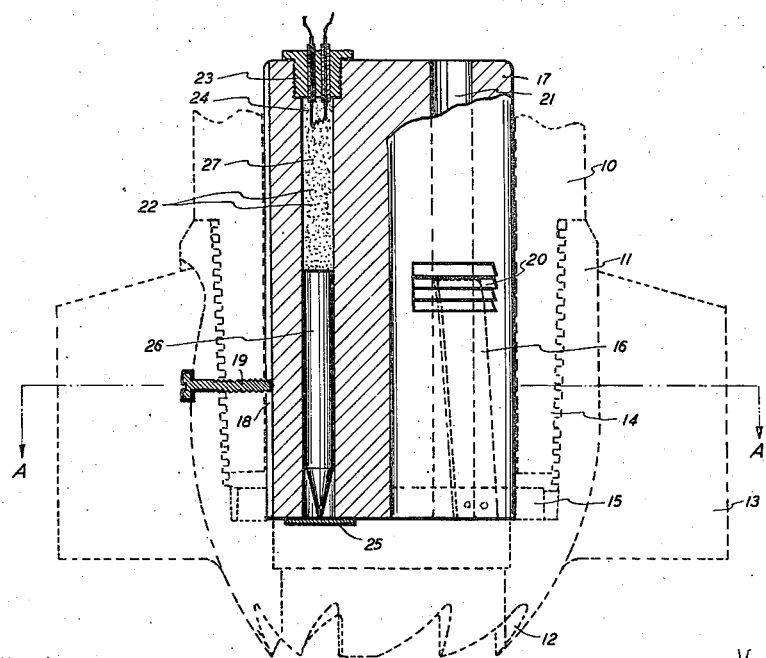
Figure 2:
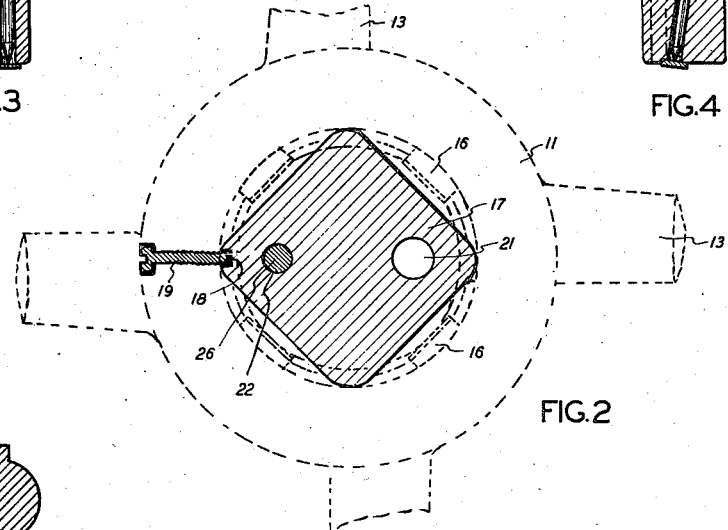
Fig. 2 is a cross section on the line A—A of Fig. 1.

Referring first to Figs. 1 and 2, 10 is a portion of the lower end of a core barrel and 11 a cutting head having teeth 12 and reaming blades 13. The head screws onto the barrel as indicated at 14 and a ring 15, held between the head and the end of the barrel, carries flat springs 16—16 which act as a core catcher. This arrangement is conventional and I claim no invention therein.

Within the core barrel I place a body block 17 which may be rectangular as shown or may be of cylindrical form. This block is provided with a slot 18 engaged by a screw or pin 19 to prevent the block from turning in the barrel. The block may be supported in a position at the lower end of the barrel by engaging the inner edge of the upper face of ring 15 or by the engagement of the upper ends of springs 16 with notches 20 formed in the sides of the block. In either case the block is inserted into the barrel from below, before the cutting head is attached.

A water passage 21 through the length of the block is provided, in order that circulating fluid may pass through the block.

The block is also provided with a means for making permanent marks in one or more positions on the top or in the upper portion of the core. This means comprises a longitudinal bore 22 through the block, a breech block 23, a means of firing a charge of explosive as indicated at 24, and a means as indicated at 25 for retaining a projectile in the base. The breech block may screw into nonleaking engagement with the upper end of the bore as shown, and the retaining means may be a small plate of thin metal soldered or brazed over the lower end of the bore so as to exclude water but not to materially impede the downward passage of a projectile when driven by the explosion of a charge of powder 27.

To operate the device the bore is charged with a suitable explosive and the projectile placed in position, after which the retaining plate 25 is made fast and tight. The block 17 is then placed in position in the core barrel with screw 19 so adjusted in slot 18 as to prevent rotation of the block within the barrel but not to prevent longitudinal upward movement of the block.

After placing the core barrel in a known position, as above described, the bottom of the hole should be completely free from debris by forcing circulating fluid through the water passage 21, from which it passes over the bottom of the hole between the teeth 12 of the cutting head 11. This will prevent any deflection of the projectile in passing from bore 22 into the formation to be marked.

The core barrel containing the block is then lowered into the hole from which the core is to be taken, in such manner that the compass direction of a line struck through the axis of the bore and the axis of the block may be known when the bit comes to rest on the bottom of the hole. This may be done in any of the well known ways, as for instance, by determining this compass direction while the core barrel is suspended at the top of the hole and lowering the barrel without changing its rotative position, or by lowering the core barrel by stages and recording the deviation from its original rotative position during each stage, or by compass and photographic means after the barrel comes to rest on the bottom. I do not limit myself to any specific means for orienting the core barrel in the lower end of the hole, but specify only that its orientation must be known.

With the barrel in known position, the charge is fired by any of the well known means, as for example a timed fuse or ignitor or a go-devil dropped into the tubing by which the barrel is rotated for coring. On the explosion of the charge the projectile is driven through the soft retaining plate 25 and enters the upper surface of the formation from which the core is later taken, in the same position as regards the axis of the core as that occupied by the bore in relation to the axis of the core barrel. A legible and permanent mark is thus produced.

The charge having been fired, the coring bit and barrel are placed in rotation and the core formed in the usual manner, the block riding up inside the barrel on top of the core. The springs 16 resume their normal function as core catchers as soon as the block has passed from between them and when a sufficient length of core has been made the bit is brought to the surface and the core withdrawn.

On removal of the core from the barrel the projectile mark indicating the known rotative position of the bore in the block as regards the axis of the core is used to bring the core back to its original compass position, and the direction of dip which may be indicated by any transverse markings or contact planes in the length of the core may thus be readily ascertained.

Figure 3:
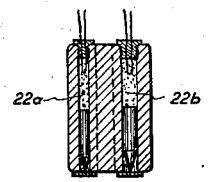
Figs. 3 and 4 illustrate modified forms of the device, in vertical section and on a reduced scale.

In the modification shown in Fig. 3 the block is provided with two bores 22a and 22b, carrying projectiles of different diameter or of differing cross sectional outline and located on opposite sides of the axis of the block.

Each of these two projectiles makes a distinctive, legible and permanent mark in the formations, either one of which marks, may serve to bring the core back to its original compass position and where both marks are recovered in the same core, an additional check and a greater accuracy in the result is provided. The reason that there is actually an additional check when both marks are discernible in the same core is that a line joining the centers of these marks has a more definite orientation than when there is only one mark.

The orientation of the line between the centers of the apertures 22a and 22b of Figure 3 is quite definitely known and when both marks are discernible in the core, this line is definitely transferred to the core.

When only one mark is discernible in the core, then the orientation obtainable from such a mark depends on more than one factor. While the radial direction from the center of the core barrel to the center of one of the apertures 22a or 22b is accurately known, yet, during the cutting of the core, the core barrel may depart slightly from its original axial position in the bore hole. For this reason, the exact center from which the radius passing through the mark emanates is not quite accurately known in the core and, therefore, a measurement based on one mark only is not as definitely accurate as a measurement based on the duplex marks. Since, as explained above, the duplex mark is independent of any inaccuracy in the cutting of the core after the marks have been made in the formations before the core was cut.

Figure 4:
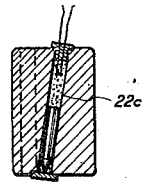
Figure 5:
Fig. 5 is a cross section of a projectile having an irregular outline.

In the modification shown in Fig. 4 a single bore 22c is inclined to the vertical so that a vertical plane may be struck through the tracer left by the projectile when it penetrates the formation to any material depth. In Fig. 5 is shown a modification in which the projectile is of other than circular outline and is held in a fixed rotative position in the block, thus orienting the marking by the orientation of the projectile itself rather than by its position as regards the axis of the core. In this modification the projectile may be discharged from the center of the block if desired.

I claim as my invention:

1. The method of orienting a test core which comprises: impressing a permanent marking on the upper surface of an underground formation by firing an explosive charge and thereby impelling a projectile into said surface, and thereafter forming said core including said marking in a position eccentric to the axis of said core and in a known direction from said axis.

2. The method of orienting a test core which comprises: placing a core forming means adjacent the upper surface of an underground formation and in a known orientation; passing circulating fluid through said means and thereby freeing said surface from debris; firing an explosive charge and thereby impelling a projectile into said formation to impress on said surface a permanent marking eccentric to the axis of said means and in a known rotative relation to said means, and thereafter rotating said means to form a core including said marking.

3. A device for marking the upper surface of an underground formation to orient a core formed therefrom, comprising: a block adapted to fit within a core barrel and means for retaining said block in a fixed rotative position in said barrel; a longitudinal bore within said block adapted to hold a projectile and an explosive charge, and means for firing said charge to impel said projectile into said surface at a point eccentric to said axis.

4. A device substantially as and for the purpose set forth in claim 3, including a plurality of said substantially longitudinal bores through said block and means for firing explosive charges and thereby discharging projectiles at high velocity from said bores into said surface, said projectiles being arranged to effect markings individually distinguishable.

5. The method of orienting a test core which comprises: placing a core forming means adjacent the upper surface of an underground formation and in a known orientation; impressing on said surface a plurality of spaced markings in known rotative relation to said means, and thereafter rotating said means to form a core including said markings.

6. The method of orienting a test core which comprises: placing a core forming means adjacent the upper surface of an underground formation and in a known orientation; impressing on said surface a plurality of spaced markings in known rotative relation to said means by firing explosive charges and thereby impelling projectiles into said surface, and thereafter rotating said means to form a core including said markings.

ELMER L. DE MARIS.